United States Patent
Wachtfogel et al.

(10) Patent No.: US 11,470,362 B1
(45) Date of Patent: Oct. 11, 2022

(54) PROVIDING AUDIO DATA FOR A VIDEO FRAME

(71) Applicant: Synamedia Limited, Staines Upon Thames (GB)

(72) Inventors: Zorach Reuven Wachtfogel, Elazar (IL); Ilan Cohen, Herzliya (IL)

(73) Assignee: Synamedia Limited, Staines Upon (GB)

(*) Notice: Subject to any disclaimer, the term of this patent is extended or adjusted under 35 U.S.C. 154(b) by 0 days.

(21) Appl. No.: 17/233,916

(22) Filed: Apr. 19, 2021

(51) Int. Cl.
  *H04N 21/233* (2011.01)
  *H04N 21/6332* (2011.01)
  *H04N 21/8547* (2011.01)
  *H04N 21/43* (2011.01)

(52) U.S. Cl.
  CPC ..... *H04N 21/233* (2013.01); *H04N 21/43072* (2020.08); *H04N 21/6332* (2013.01); *H04N 21/8547* (2013.01)

(58) Field of Classification Search
  CPC ........... H04N 21/233; H04N 21/43072; H04N 21/6332; H04N 21/8547
  See application file for complete search history.

(56) References Cited

U.S. PATENT DOCUMENTS

| | | | | |
|---|---|---|---|---|
| 2013/0155318 A1* | 6/2013 | Boden | ................ | H04N 21/4307 348/425.4 |
| 2013/0272672 A1* | 10/2013 | Padro Rondon | ....... | G03B 31/04 386/201 |
| 2015/0208188 A1* | 7/2015 | Carlsson | ................ | H04S 7/301 381/79 |

* cited by examiner

*Primary Examiner* — Yassin Alata

(74) *Attorney, Agent, or Firm* — Fernando & Partners, LLP

(57) ABSTRACT

In some implementations, a device includes one or more processors and a non-transitory memory. In some implementations, a method includes determining that a video frame to be presented at a client device includes a portion that corresponds to a particular playback position within a video content item. In some implementations, the method includes obtaining audio data that corresponds to the particular playback position within the video content item. In some implementations, the method includes transmitting the audio data to the client device separate from the video frame.

17 Claims, 10 Drawing Sheets

PROVIDING AUDIO DATA FOR A VIDEO FRAME

TECHNICAL FIELD

The present disclosure generally relates to providing audio data for a video frame.

BACKGROUND

Some devices are capable of presenting a graphical user interface (GUI). Some devices are also capable of presenting a media content item with video and audio. In some scenarios, the GUI may include a portion of a media content item. As such, in some scenarios, a device may need to simultaneously present video and audio corresponding to a portion of a media content item while displaying a GUI.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
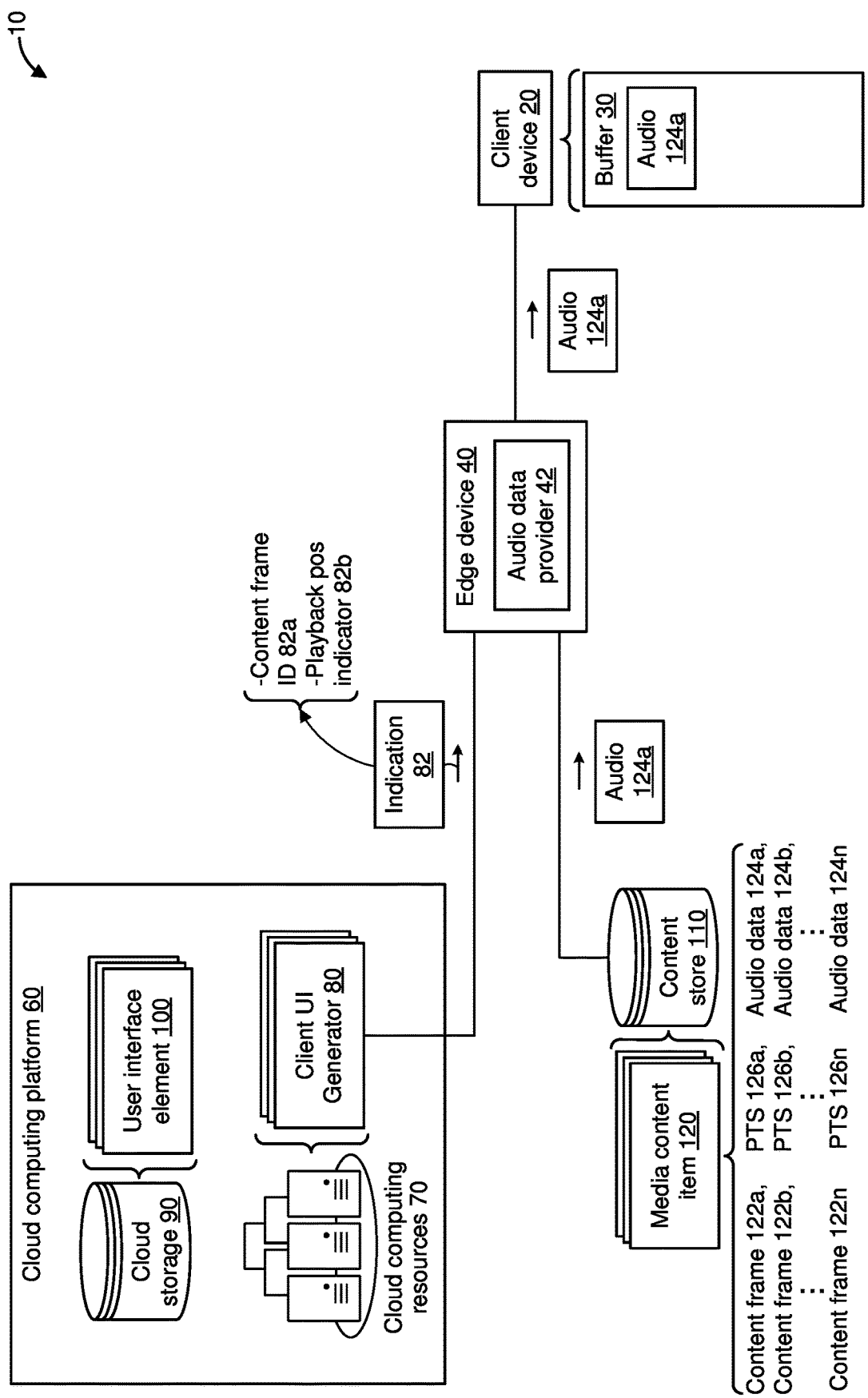
FIGS. 1A-1G are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for providing audio data for a video frame. In some implementations, a device includes one or more processors and a non-transitory memory. In some implementations, a method includes determining that a video frame to be presented at a client device includes a portion that corresponds to a particular playback position within a video content item. In some implementations, the method includes obtaining audio data that corresponds to the particular playback position within the video content item. In some implementations, the method includes transmitting the audio data to the client device separate from the video frame.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

EXAMPLE EMBODIMENTS

A resource-constrained client device may not have sufficient computing resources to render a graphical user interface (GUI). As such, the client device may receive video frames that correspond to the GUI from an edge device and/or a cloud computing platform that generates the video frames corresponding to the GUI. In some scenarios, the GUI may include a portion of a media content item (e.g., a video content item such as a movie, a TV show, a video game, etc.). For example, the GUI may include representations of various media content items and a video preview of one of the media content items that has been selected.

While a video component of the video preview can be incorporated in the video frames that correspond to the GUI, sending an audio component of the video preview with the video frames may adversely impact a user experience provided by the client device. For example, if delivery of a video frame is delayed to the client device, a previous video frame can be displayed at the client device for a prolonged time duration. As such, the delay in delivery of a particular video frame may not be noticeable to a user of the client device. However, if delivery of a particular audio segment to the client device is delayed, re-playing a previous audio segment may draw attention to the delayed delivery of the audio segment. Alternatively, not playing audio while the client device waits for the delayed audio segment will also likely be noticed by the user of the client device. As such, there is a need for timely delivery of audio segments in order to provide a suitable user experience to a user of the client device. Additionally, sending the audio component of the video preview with the video frames may unnecessarily require additional computing resources to decode the audio data and subsequently re-encode the audio data for transmission with the video frames.

The present disclosure provides methods, systems, and/or devices for timely delivery of audio data that corresponds to a portion of a video content item that is included in video frames depicting a GUI. A device determines that a video frame that is to be presented at a client device includes a video component that corresponds to a particular playback position within a video content item. The device obtains audio data that corresponds to the particular playback position and transmits the audio data to the client device prior to the video frame being transmitted to the client device. Since the client device receives the audio data prior to the video frame, the client device can output the audio data in a timely manner even if the delivery of the video frame is delayed. For example, since the client device receives the audio data prior to receiving the corresponding video frame, the client device can utilize the audio data to generate and play an audible signal even when delivery of the corresponding video frame is delayed and the client device displays a previous video frame for a prolonged time duration.

FIG. 1A is a diagram that illustrates an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes a client device 20, an edge device 40, a cloud computing platform 60 and a content store 110. In some implementations, the edge device 40 is a part of an edge computing network (not shown).

In various implementations, the content store 110 stores a set of one or more media content items 120. In some implementations, a media content item 120 (e.g., each of the media content items 120) includes a set of content frames (e.g., a first content frame 122a, a second content frame 122b, . . . , and an nth content frame 122n). In some implementations, each content frame is associated with a corresponding audio data (e.g., a corresponding audio segment). For example, the first content frame 122a is associated with a first audio data 124a, the second content frame 122b is associated with a second audio data 124b, . . . , and the nth content frame 122n is associated with an nth audio data 124n. In some implementations, the content frames and the audio data are associated with respective presentation timestamps (PTSs). For example, the first content frame 122a and the first audio data 124a are associated with a first presentation timestamp 126a, the second content frame 122b and the second audio data 124b are associated with a second presentation timestamp 126b, . . . , and the nth content frame 122n and the nth audio data 124n are associated with an nth presentation timestamp 126n.

Although the content store 110 is shown as being separate from the edge device 40 and the cloud computing platform 60, in some implementations, the content store 110 is integrated into the edge device 40 and/or the cloud computing platform 60. In some implementations, the content store 110 includes a distributed storage system.

In some implementations, the client device 20 is coupled with a display. For example, in some implementations, the client device 20 includes a dongle that is connected to a television. Alternatively, in some implementations, the client device 20 is integrated into a display (e.g., a television). As shown in FIG. 1A, in some implementations, the client device 20 includes a buffer 30 for temporarily storing video frames and/or audio data.

In various implementations, the client device 20 is capable of presenting content in a buffered content presentation mode or a real-time content presentation mode. In the buffered content presentation mode, the client device 20 obtains video frames (e.g., the content frames 122a, 122b, . . . , and 122n) from the edge device 40, and the client device 20 stores the video frames in the buffer 30 until it is time to present the video frames. In the real-time content presentation mode, the client device 20 receives video frames from the edge device 40 or the cloud computing platform 60, and the client device 20 presents the received video frames without first storing the video frames in the buffer 30.

In some implementations, the client device 20 concurrently presents a content frame and a corresponding audio data when a current playback position corresponds to the presentation timestamp associated with the content frame and the audio data. For example, the client device 20 concurrently displays the first content frame 122a and outputs an audible signal corresponding to the first audio data 124a when a current playback position corresponds to the first presentation timestamp 126a.

In various implementations, the cloud computing platform 60 includes cloud computing resources 70 and cloud storage resources 90 ("cloud storage 90", hereinafter for the sake of brevity). In some implementations, the cloud computing resources 70 include server computers with numerous processors. In some implementations, the cloud computing resources 70 implement a set of one or more client UI generators 80 that generate UI frames (e.g., video frames that depict a GUI, for example, video frames that include representations of graphical user interface elements) for client devices such as the client device 20. In some implementations, a single instance of a client UI generator 80 generates UI frames for a single client device at a given time. Alternatively, in some implementations, a single instance of a client UI generator 80 can generate UI frames for multiple client devices. In some implementations, the client UI generator 80 is referred to as a UI application. In some implementations, the cloud computing resources 70 implement an instance of the client UI generator 80 by executing a set of computer-readable instructions that correspond to the client UI generator 80.

In some implementations, the cloud storage 90 stores images 100 of user interface elements ("UI images 100", "UI element images 100" or "user interface elements 100", hereinafter for the sake of brevity). In some implementations, the UI images 100 include a scrub bar image that represents a scrub bar that is overlaid on a content frame being displayed at the client device 20 during a scrubbing operation. In some implementations, the UI images 100 include a volume bar image that represents a volume bar that is overlaid on a content frame being displayed at the client device 20 during a volume adjustment operation. In some implementations, the UI images 100 include an information box image (e.g., an image of a text box that provides information regarding a media content item) that is overlaid on a content frame being displayed at the client device 20 during a user interface operation that corresponds to a request to display information regarding a media content item. In some implementations, the UI images 100 include a subtitle bar image that is overlaid on a content frame being displayed at the client device 20 in response to a user interface operation that corresponds to a request to display subtitles for a media content item. In some implementations, the UI images 100 include bitmaps.

In some implementations, the edge device 40 includes an audio data provider 42 that provides appropriate ones of the audio data 124a, 124b, . . . , and 124n to the client device 20. In some implementations, the edge device 40 (e.g., the audio data provider 42) obtains an indication 82 that a video frame (e.g., a UI frame) to be presented at the client device 20 includes a representation of one of the UI elements 100 and a representation of the first content frame 122a. In some implementations, the edge device 40 receives the indication 82 from the cloud computing platform 60 (e.g., from the client UI generator 80) prior to the video frame being generated by the cloud computing platform 60 and/or prior to the video frame being transmitted to the client device 20. Alternatively, in some implementations, the edge device 40 receives the indication 82 from the client device 20. Alternatively, in some implementations, the edge device 40 generates the indication 82. For example, in some implementations, the edge device 40 (e.g., the audio data provider 42) determines that a video frame (e.g., a UI frame) to be presented at the client device 20 includes one or more of the UI elements 100 and a representation of the first content frame 122a.

In some implementations, the indication 82 includes a content frame identifier (ID) 82a that identifies a particular one of the content frames 122a, 122b, . . . , and 122n that is to be incorporated in a UI frame that will be transmitted to the client device 20. For example, in some implementations, the content frame identifier 82a includes an ID of the first content frame 122a. In some implementations, the indication 82 includes a playback position indicator 82b that includes a value that corresponds to a particular one of the presentation timestamps 126a, 126b, . . . , and 126n. For example, in some implementations, the playback position indicator 82b includes a value that corresponds to the first presentation timestamp 126a.

In various implementations, the audio data provider 42 identifies a particular one of the audio data 124a, 124b, . . . , and 124n based on the content frame indicated by the content frame ID 82a or the playback position indicator 82b. In the example of FIG. 1A, the audio data provider 42 obtains the first audio data 124a, for example, because the content frame ID 82a identifies the first content frame 122a or because the playback position indicator 82 identifies the first presentation timestamp 126a. More generally, in various implementations, the audio data provider 42 obtains (e.g., retrieves) a particular one of the audio data 124a, 124b, . . . , and 124n that matches the content frame indicated by the indication 82.

As illustrated in FIG. 1A, the edge device 40 (e.g., the audio data provider 42) transmits the first audio data 124a to the client device 20. In some implementations, the edge device 40 instructs the client device 20 to store the first audio data 124a in the buffer 30 until it is time to output an audible signal that corresponds to the first audio data 124a. In some implementations, the first audio data 124a that the edge device 40 transmits to the client device 20 is associated with the first presentation timestamp 126a, and the edge device 40 instructs the client device 20 to generate and output an audible signal that corresponds to the first audio data 124a when the client device 20 receives a video frame that is associated with the first presentation timestamp 126a.

Figure 1B:
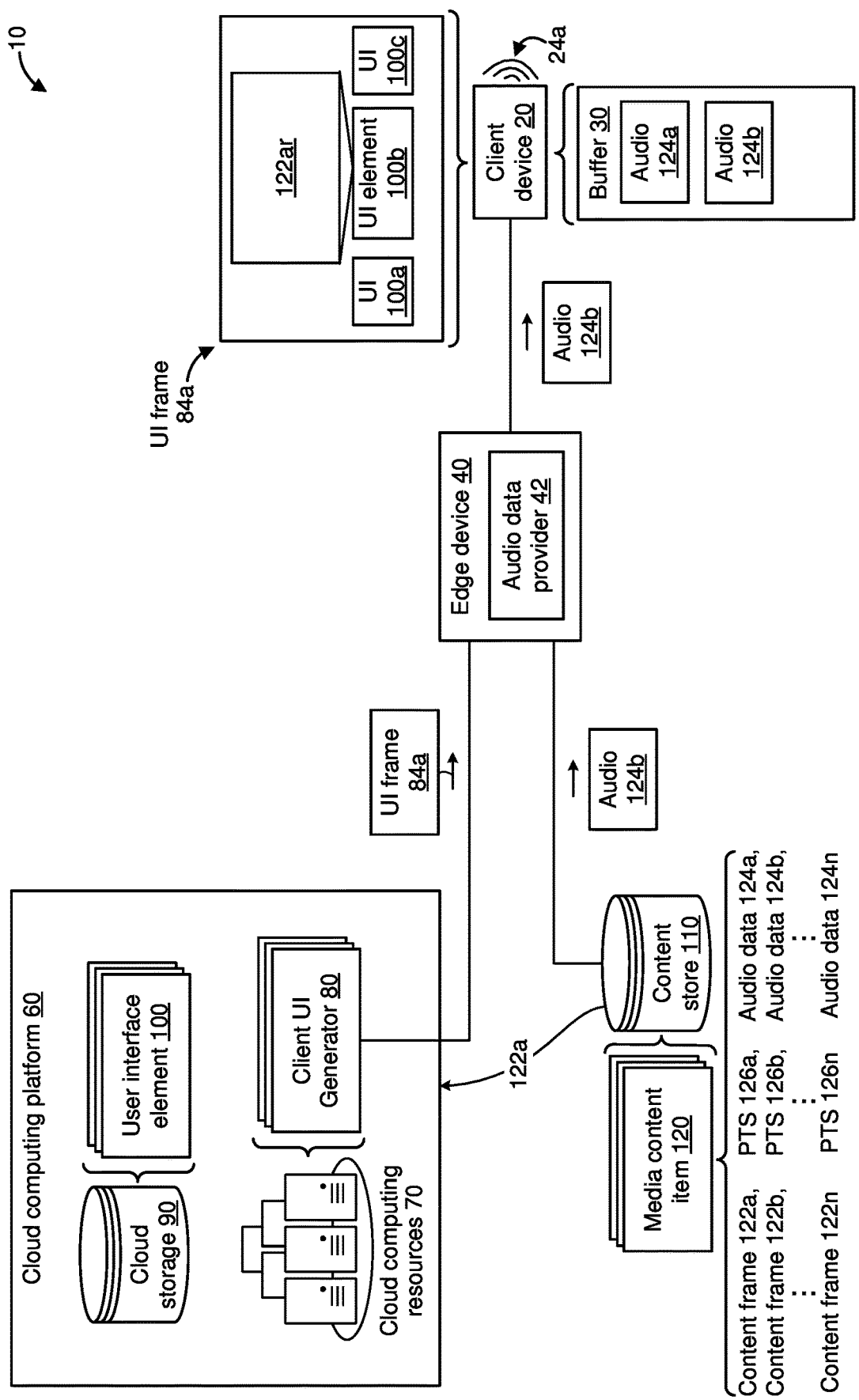

Referring to FIG. 1B, in some implementations, the client UI generator 80 generates a first UI frame 84a for the client device 20. In the example of FIG. 1B, the client UI generator 80 transmits the first UI frame 84a to the client device 20 via the edge device 40. In some implementations, the first UI frame 84a includes UI elements 100a, 100b and 100c that represent respective ones of the media content items 120. In some implementations, the first UI frame 84a is a part of a sequence of UI frames that provides a preview of a media content item 120 represented by the UI element 100b. As such, the client UI generator 80 obtains the first content frame 122a from the content store 110, and the client UI generator 80 includes a reduced-size version 122ar of the first content frame 122a in the first UI frame 84a.

The edge device 40 instructs the client device 20 to display the first UI frame 84a in the real-time content presentation mode. As such, the client device 20 displays the first UI frame 84a on a display coupled with the client device 20 without first storing the first UI frame 84a in the buffer 30. In some implementations, the first UI frame 84a is associated with the first presentation timestamp 126a. Since the first audio data 124a and the first UI frame 84a are associated with the first presentation timestamp 126a, the client device 20 concurrently presents the first audio data 124a and the first UI frame 84a. As such, the client device 20 generates and outputs an audible signal 24a corresponding to the first audio data 124a when the client device 20 displays the first UI frame 84a.

In some implementations, the edge device 40 (e.g., the audio data provider 42) provides a subsequent audio data to the client device 20. In the example of FIG. 1B, the edge device 40 provides the second audio data 124b to the client device 20, and the edge device 40 instructs the client device 20 to store the second audio data 124b in the buffer 30 until the client device 20 receives a video frame that corresponds to the second audio data 124b (e.g., until the client device 20 receives a video frame that is associated with the second presentation timestamp 126b).

Figure 1C:
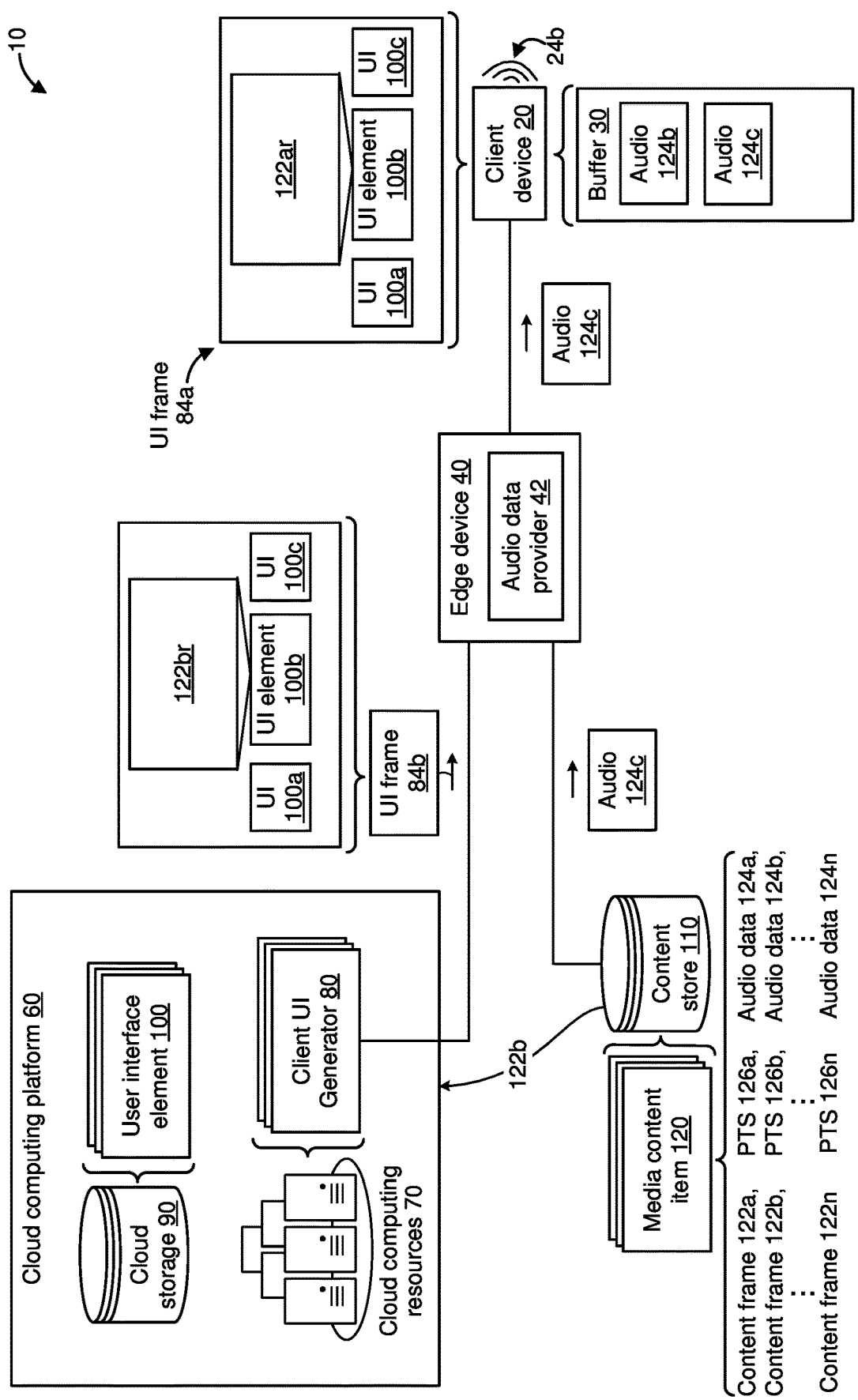

Referring to FIG. 1C, in some implementations, the client UI generator 80 generates and transmits a second UI frame 84b to the client device 20 via the edge device 40. As illustrated in FIG. 1C, the second UI frame 84b includes the UI elements 100a, 100b and 100c, and a reduced-size version 122br of the second content frame 122b. In some implementations, the first UI frame 84a includes a beginning portion of a preview of the media content item 120 represented by the UI element 100b, and the second UI frame 84b includes a subsequent portion of the preview of the media content item 120 represented by the UI element 100b.

In the example of FIG. 1C, delivery of the second UI frame 84b to the client device 20 is delayed or interrupted, for example, due to network congestion. As such, the client device 20 displays the first UI frame 84a for a prolonged time duration. For example, the client device 20 displays the first UI frame 84a for a first time duration during which the client device 20 was scheduled to display the first UI frame 84a and for a second time duration during which the client device 20 was scheduled to display the second UI frame 84b. However, because the second audio data 124b is stored in the buffer 30 of the client device 20 and the client device 20 does not have to wait to receive the second audio data 124b, the client device 20 presents the second audio data 124b for the second time duration during which the client device 20 was scheduled to display the second UI frame 84b. As illustrated in FIG. 1C, the client device 20 generates and outputs an audible signal 24b that corresponds to the second audio data 124b while displaying the first UI frame 84a for a prolonged time duration due to a delay or an interruption in receiving the second UI frame 84b at the client device 20. Since interruptions or delays in audio presentation tend to be more noticeable to a person than interruptions or delays in video presentation, playing an audio segment even when the corresponding video segment is delayed or interrupted tends to reduce a likelihood of the delay or interruption being noticed thereby enhancing a user experience of the client device 20.

In some implementations, the edge device 40 (e.g., the audio data provider 42) provides a subsequent audio data to the client device 20. In the example of FIG. 1C, the edge device 40 provides a third audio data 124c to the client device 20, and the edge device 40 instructs the client device 20 to store the third audio data 124c in the buffer 30 until the client device 20 receives a video frame that corresponds to the third audio data 124c (e.g., until the client device 20 receives a video frame that is associated with a third presentation timestamp).

Figure 1D:
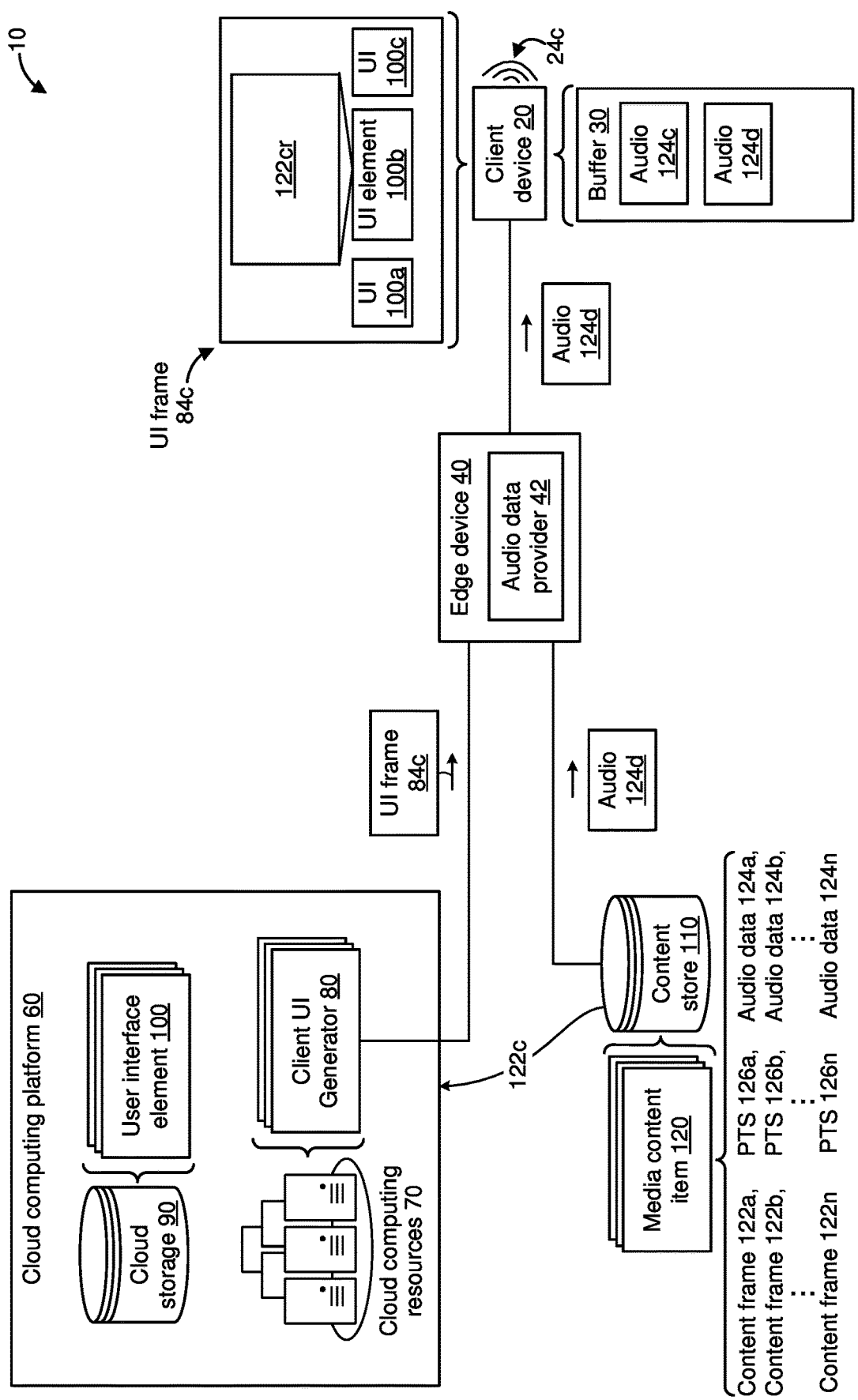

Referring to FIG. 1D, in some implementations, the client UI generator 80 generates and transmits a third UI frame 84*c* to the client device 20 via the edge device 40. As illustrated in FIG. 1D, the third UI frame 84*c* includes the UI elements 100*a*, 100*b* and 100*c*, and a reduced-size version 122*cr* of a third content frame 122*c*. In some implementations, the third UI frame 84*c* includes a portion of the preview of the media content item 120 that occurs after the portion of the preview represented by the second UI frame 84*b*.

In the example of FIG. 1D, the third UI frame 84*c* is delivered to the client device 20 in a timely manner. As such, the client device 20 concurrently presents the third UI frame 84*c* and the third audio data 124*c*. In some implementations, the client device 20 concurrently presents the third UI frame 84*c* and the third audio data 124*c* because the third UI frame 84*c* and the third audio data 124*c* are associated with the same presentation timestamp (e.g., a third presentation timestamp). As shown in FIG. 1D, the client device 20 generates and outputs an audible signal 24*c* that corresponds to the third audio data 124*c* when the client device 20 is displaying the third UI frame 84*c*.

In the example of FIG. 1D, the edge device 40 provides a fourth audio data 124*d* to the client device 20, and the edge device 40 instructs the client device 20 to store the fourth audio data 124*d* in the buffer 30 until the client device 20 receives a video frame that corresponds to the fourth audio data 124*d* (e.g., until the client device 20 receives a video frame that is associated with a fourth presentation timestamp).

Figure 1E:
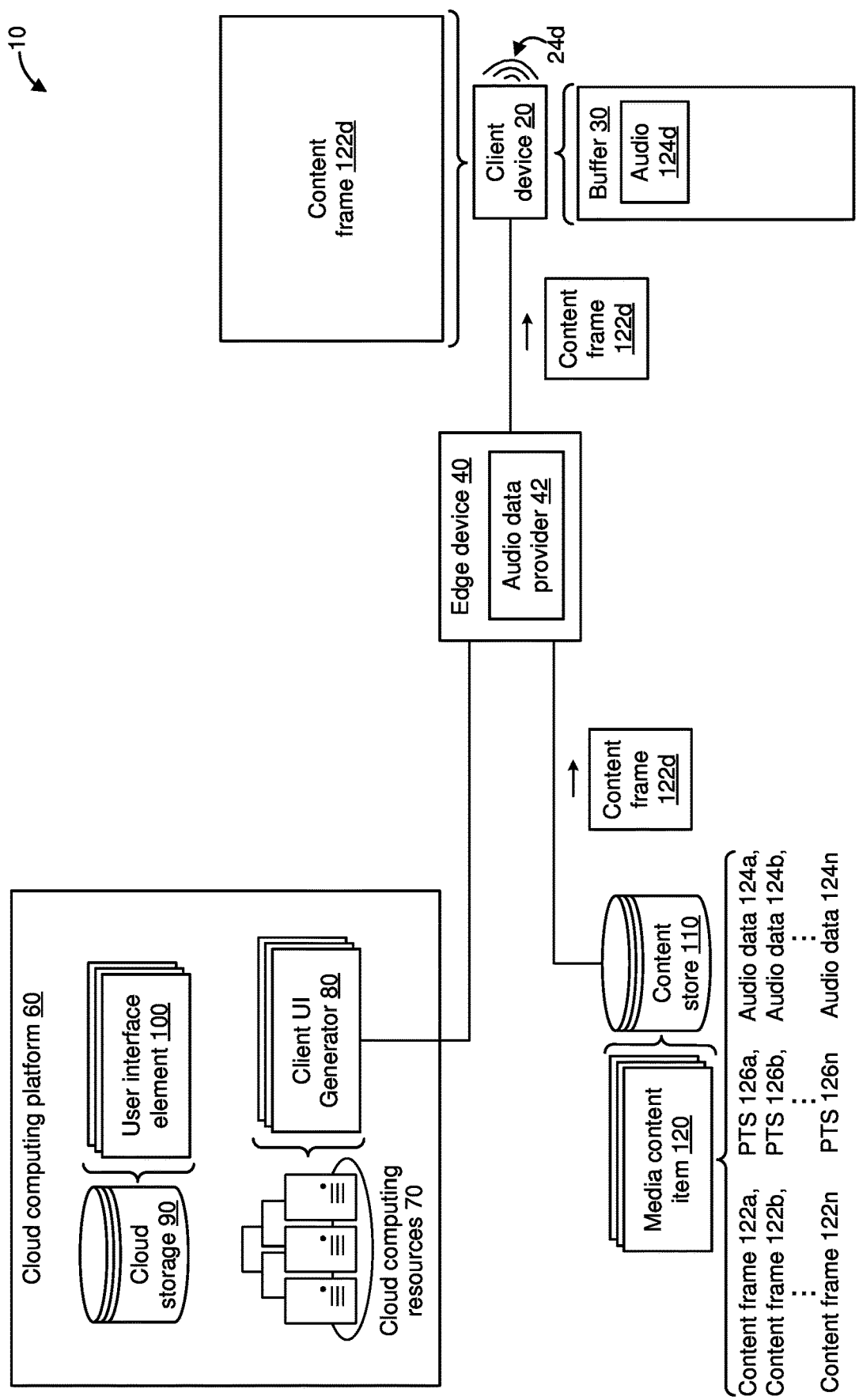

In the example of FIG. 1E, the edge device 40 has switched the client device 20 from the real-time content presentation mode to the buffered content presentation mode. As such, the edge device 40 obtains content frames from the content store 110, the edge device 40 transmits the content frames to the client device 20, and the client device 20 subsequently presents the content frames. In the example of FIG. 1E, the edge device 40 obtains a fourth content frame 122*d* from the content store 110, and transmits the fourth content frame 122*d* to the client device 20. The client device 20 concurrently presents the fourth content frame 122*d* and the fourth audio data 124*d*. For example, the client device 20 generates and outputs an audible signal 24*d* that corresponds to the fourth audio data 124 while displaying the fourth content frame 122*d*. Since the client device 20 already has the fourth audio data 124*d*, the client device 20 outputs the audible signal 24*d* even if delivery of the fourth content frame 122*d* is delayed or interrupted during the switch from real-time content presentation mode to the buffered content presentation mode. As such, receiving and storing a threshold number of audio data prior to receiving the corresponding video frames tends to reduce a likelihood to interruptions (e.g., glitches) in audio presentation when the client device 20 is being switched between the real-time content presentation mode and the buffered content presentation mode.

Figure 1F:
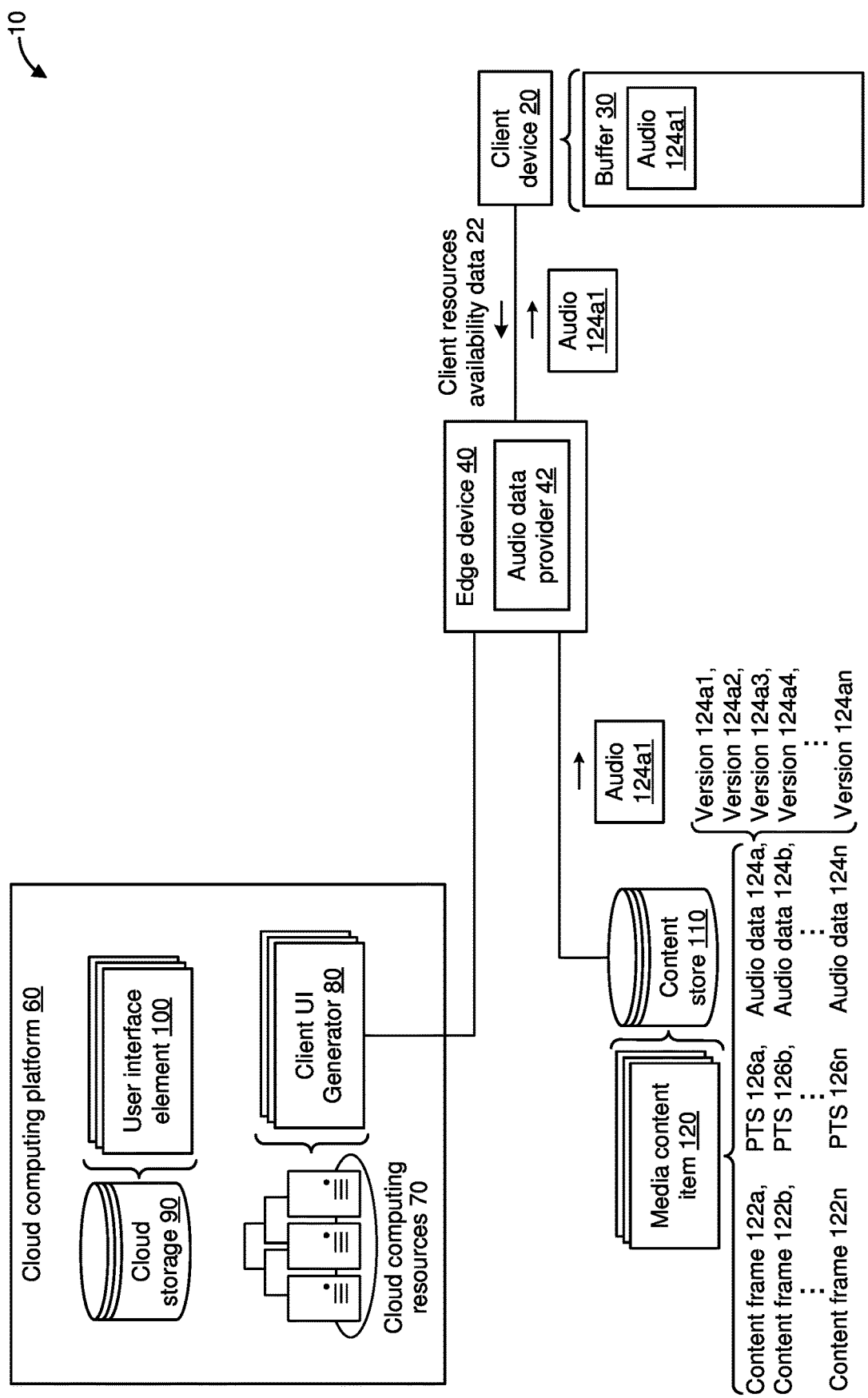

Referring to FIG. 1F, in some implementations, the content store 110 stores different versions of audio data, and the audio data provider 42 selects a particular one of the versions based on client resources availability data 22 that indicates an availability of resources to the client device 20. As illustrated in FIG. 1F, the content store 110 stores a first version 124*a*1, a second version 124*a*2, a third version 124*a*3, a fourth version 124*a*4, . . . , and an nth version 124*an* of the first audio data 124*a*.

In some implementations, different versions of the audio data correspond to different sampling rates. For example, in some implementations, the first version 124*a*1 corresponds to a first sampling rate and the second version 124*a*2 corresponds to a second sampling rate that is greater than the first sampling rate. In some implementations, the client resources availability data 22 indicates an amount of bandwidth that is available to the client device 20. In some implementations, the audio data provider 42 selects the first version 124*a*1 in response to the amount of available bandwidth being less than a threshold amount of bandwidth. In some implementations, the audio data provider 42 selects the second version 124*a*2 in response to the amount of available bandwidth being greater than the threshold amount of bandwidth. More generally, in various implementations, the audio data provider 42 provides different versions of the audio data 124*a*, 124*b*, . . . , and 124*n* (e.g., versions associated with different sampling rates) based on the amount of bandwidth that is available to the client device 20.

In some implementations, different versions of the audio data are configured to be output via different types of speakers (e.g., via different numbers of speakers). For example, in some implementations, the third version 124*a*3 corresponds to a stereophonic version that is configured to be output via two speakers (e.g., the third version 124*a*3 is more suitable to be output via two speakers), and the fourth version 124*a*4 corresponds to a surround sound version that is configured to be output via five or more speakers (e.g., the fourth version 124*a*4 is more suitable to be output via five or more speakers). In some implementations, the client resources availability data 22 indicates a number of speakers that are coupled with (e.g., connected to, for example, wirelessly or via one or more wires) the client device 20. In some implementations, the audio data provider 42 selects the third version 124*a*3 (e.g., the stereophonic version) in response to the number of speakers being less than a threshold number of speakers (e.g., in response to the number of speakers being less than three). In some implementations, the audio data provider 42 selects the fourth version 124*a*4 (e.g., the surround sound version) in response to the number of speakers being greater than or equal to the threshold number of speakers (e.g., in response to the number of speakers being greater than or equal to three). More generally, in various implementations, the audio data provider 42 provides different versions of the audio data 124*a*, 124*b*, . . . , and 124*n* based on a number of speakers that are coupled with the client device 20.

Figure 1G:
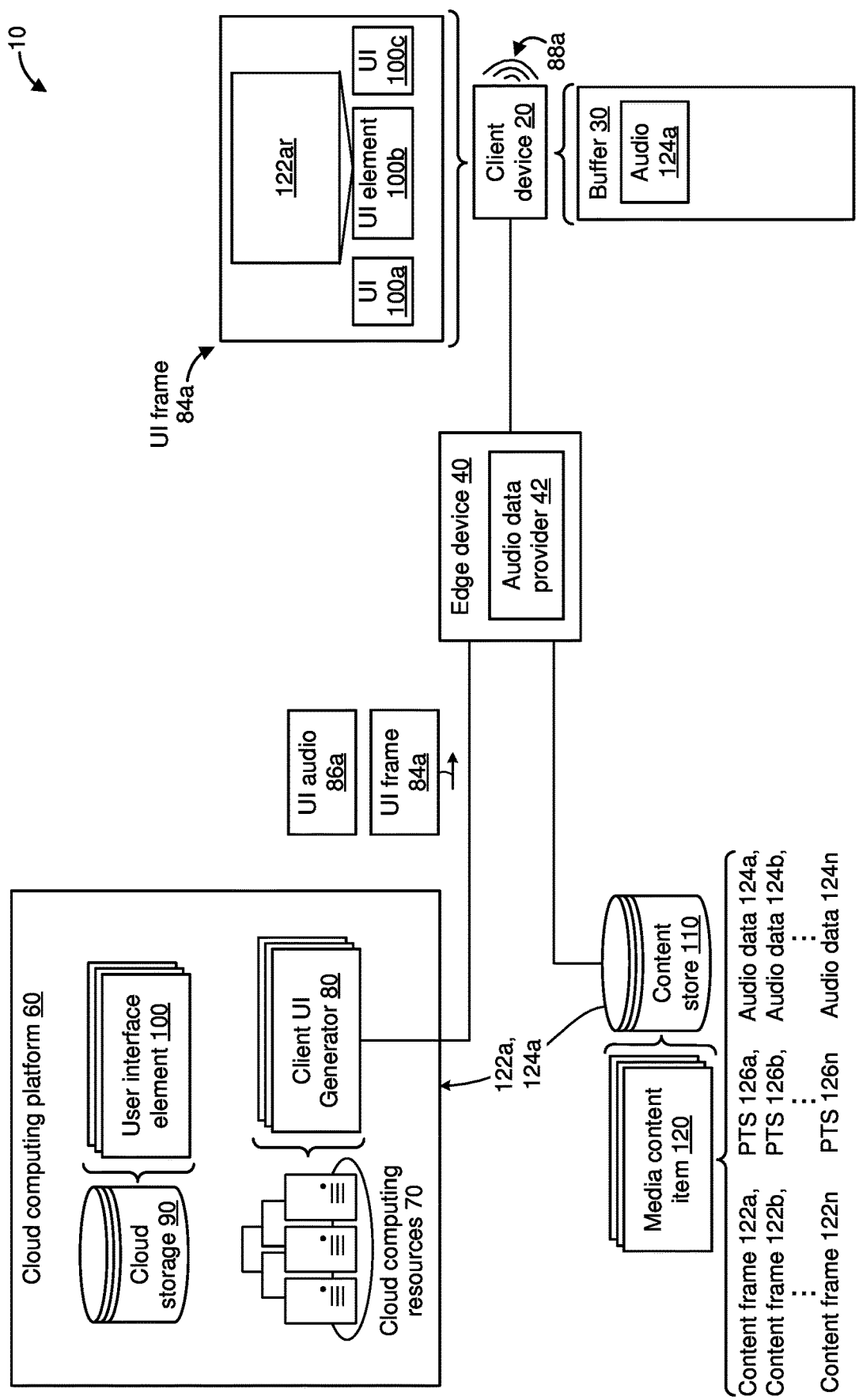

Referring to FIG. 1G, in some implementations, the audio data provider 42 overrides audio data that the audio data provider 42 previously transmitted to the client device 20 with new audio data provided by the client UI generator 80. In some implementations, the client UI generator 80 generates audio data that includes a combination of audio effects for a UI operation and an appropriate one of the audio data 124*a*, 124*b*, . . . , and 124*n*. In the example of FIG. 1G, the client UI generator 80 generates UI audio data 86*a* in addition to generating the first UI frame 84*a*. In some implementations, the UI audio data 86*a* includes an audio effect for a user interface operation (e.g., a sound effect corresponding to the user of the client device 20 increasing a volume of the client device 20) and the first audio data 124*a*.

In the example of FIG. 1G, the edge device 40 transmits the first UI frame 84*a* and UI audio data 86*a* to the client device 20. In some implementations, the edge device 40 instructs the client device 20 to replace the first audio data 124*a* that the edge device 40 previously transmitted to the client device 20 with the UI audio data 86*a*. In some implementations, the edge device 40 instructs the client device 20 to concurrently present the first UI frame 84*a* and the UI audio data 86a. As such, as shown in FIG. 1G, the client device 20 generates and outputs an audible signal 88a corresponding to the UI audio data 86a while displaying the first UI frame 84a. Since the UI audio data 86a includes an audio effect for a user interface operation being performed at the client device 20 (e.g., a volume adjustment operation), outputting the audible signal 88a corresponding to the UI audio data 86a provides an indication to the user of the client device 20 that the client device 20 is responding to the user interface operation requested by the user. Since, in some implementations, the UI audio data 86a includes the audio effect for the user interface operation requested by the user of the client device 20 and the first audio data 124a, outputting the audible signal 88a provides an indication of the client device 20 responding to the requested user interface operation while the client device 20 is playing audio corresponding to the reduced-size version 122ar of the first content frame 122a included within the first UI frame 84a. In some implementations, the client device 20 purges the first audio data 124a from the buffer 30 without generating and outputting an audible signal corresponding to the first audio data 124a.

Figure 2:
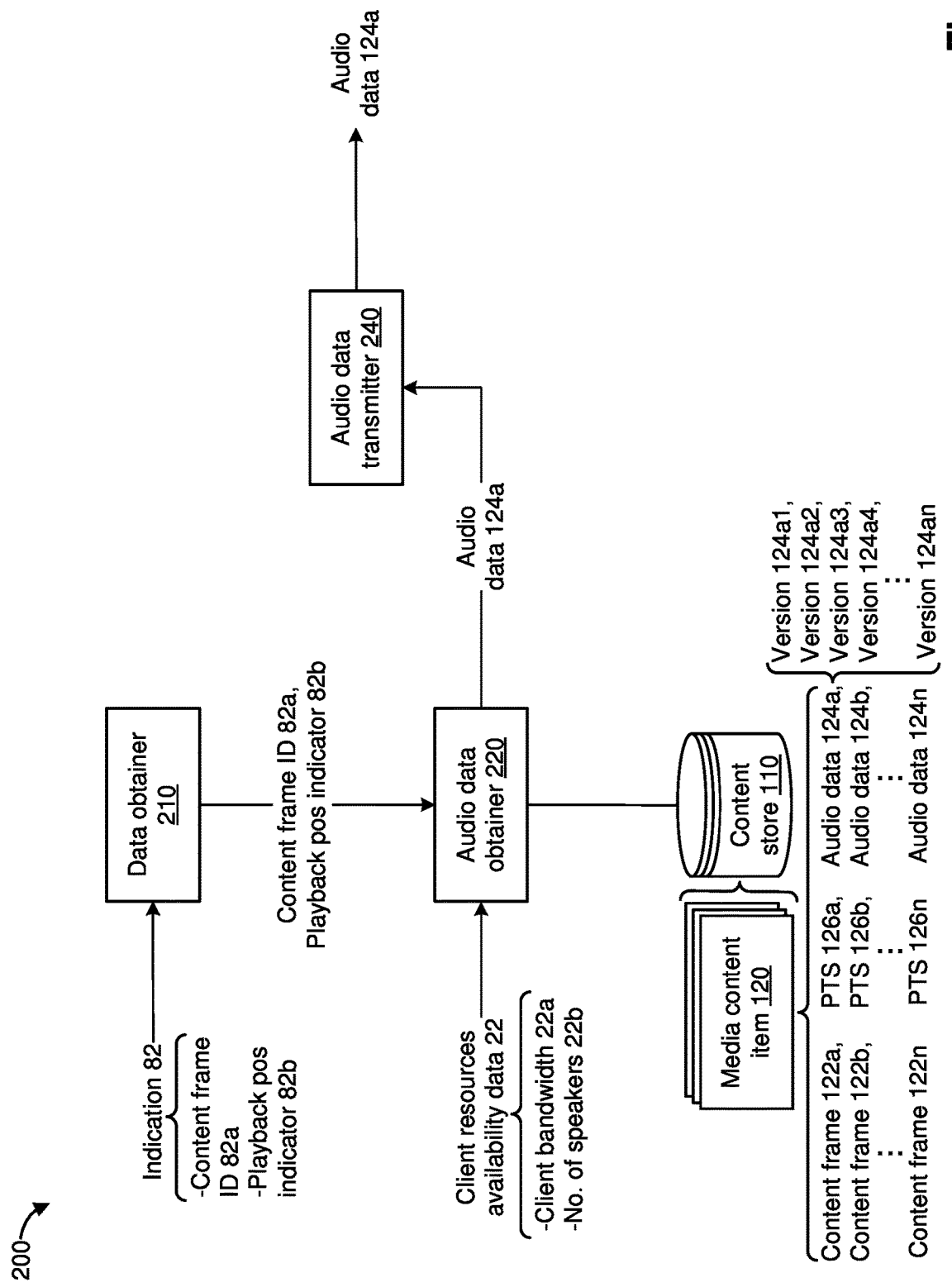
FIG. 2 is a block diagram of a system in accordance with some implementations.

FIG. 2 illustrates a system 200 in accordance with some implementations. In some implementations, the system 200 is implemented by the edge device 40 (e.g., the audio data provider 42) shown in FIGS. 1A-1G. In some implementations, the system 200 is implemented by the cloud computing platform 60 shown in FIGS. 1A-1G. In some implementations, the system 200 is distributed across the edge device 40 and the cloud computing platform 60. For example, some components of the system 200 are implemented by the edge device 40 (e.g., the audio data provider 42) while a remainder of the components of the system 200 are implemented by the cloud computing platform 60 (e.g., the client UI generator 80).

In various implementations, the system 200 provides audio data for a UI frame that includes a representation of a GUI element and a representation of a content frame that corresponds to a media content item. To that end, in some implementations, the system 200 includes a data obtainer 210, an audio data obtainer 220 and an audio data transmitter 240.

In various implementations, the data obtainer 210 obtains (e.g., receives) the indication 82 that a UI frame to be transmitted to a client device includes a representation of a content frame. In some implementations, the indication 82 indicates that the UI frame to be transmitted to the client device includes a reduced-size version of the content frame and representations (e.g., images) of one or more GUI elements (e.g., the user interface elements 100 shown in FIGS. 1A-1G). In some implementations, the indication 82 includes the content frame ID 82a of the content frame that will be included in the UI frame that is to be transmitted to the client device. In some implementations, the indication 82 includes the playback position indicator 82b corresponding to a playback position (e.g., a presentation timestamp) of a content frame that will be included in the UI frame that is to be transmitted to the client device. In some implementations, the data obtainer 210 receives the indication 82 from the cloud computing platform 60 (e.g., the client UI generator 80) shown in FIGS. 1A-1G. In various implementations, the data obtainer 210 provides the content frame ID 82a and/or the playback position indicator 82b to the audio data obtainer 220.

In various implementations, the audio data obtainer 220 obtains a particular one of the audio data 124a, 124b, . . . , and 124n that corresponds to the representation of the content frame included in the UI frame that is to be transmitted to the client device. In some implementations, the audio data obtainer 220 searches the content store 110 for the appropriate audio data based on the content frame ID 82a and/or the playback position indicator 82b. For example, in some implementations, the audio data obtainer 220 obtains a particular one of the audio data 124a, 124b, . . . , and 124n that is associated with the same presentation timestamp as the content frame indicated by the content frame ID 82a. In some implementations, the audio data obtainer 220 obtains a particular one of the audio data 124a, 124b, . . . , and 124n that is associated with a presentation timestamp that corresponds to the playback position indicator 82b. In the example of FIG. 2, the audio data obtainer 220 obtains the first audio data 124a from the content store 110, for example, because the content frame ID 82a includes an ID of the first content frame 122a and/or because the playback position indicator 82b includes a value that corresponds to the first presentation timestamp 126a.

In some implementations, the audio data obtainer 220 obtains the client resources availability data 22, and the audio data obtainer 220 selects a particular one of the versions 124a1, 124a2, 124a3, 124a4, . . . , and 124an based on the client resources availability data 22. In some implementations, the client resources availability data 22 indicates a client bandwidth 22a, and the audio data obtainer 220 selects a particular one of the versions 124a1, 124a2, 124a3, 124a4, . . . , and 124an based on the client bandwidth 22a. For example, in some implementations, the audio data obtainer 220 selects the first version 124a1 that is associated with a first sampling rate in response to the client bandwidth 22a being less than a bandwidth threshold, and the audio data obtainer 220 selects the second version 124a2 that is associated with a second sampling rate that is greater than the first sampling rate in response to the client bandwidth 22a being greater than the bandwidth threshold.

In some implementations, the client resources availability data 22 indicates a number of speakers 22b coupled with the client device, and the audio data obtainer 220 selects a particular one of the versions 124a1, 124a2, 124a3, 124a4, . . . , and 124an based on the number of speakers 22b. For example, in some implementations, the audio data obtainer 220 selects the third version 124a3 that represents a stereophonic version of the first audio data 124a in response to the number of speakers 22b being less than a threshold number of speakers, and the audio data obtainer 220 selects the fourth version 124a4 that represents a surround sound version of the first audio data 124a in response to the number of speakers 22b being greater than or equal to the threshold number of speakers.

In various implementations, the audio data obtainer 220 provides the audio data to the audio data transmitter 240, and the audio data transmitter 240 transmits the audio data to the client device. In the example of FIG. 2, the audio data transmitter 240 transmits the first audio data 124a to the client device. In some implementations, the audio data transmitter 240 transmits the audio data to the client device prior to the corresponding UI frame being transmitted to the client device. For example, as shown in FIGS. 1A and 1B, the audio data provider 42 (e.g., the audio data transmitter 240) transmits the first audio data 124a before the edge device 40 transmits the first UI frame 84a to the client device 20.

In various implementations, the audio data transmitter 240 triggers the client device to concurrently present the audio data and the corresponding UI frame. For example, as shown in FIG. 1B, the edge device 40 (e.g., the audio data transmitter 240) triggers (e.g., instructs) the client device 20 to concurrently display the first UI frame 84*a* and output the audible signal 24*a* generated based on the first audio data 124*a*. In some implementations, the audio data transmitter 240 identifies a presentation timestamp that is associated with the UI frame that the audio data corresponds to, and the audio data transmitter 240 associates the same presentation timestamp with the audio data being transmitted to the client device in order to trigger the client device to concurrently present the UI frame and the corresponding audio data. Since the audio data is being transmitted before the corresponding UI frame is transmitted to the client device, associating the audio data with the same presentation timestamp as the UI frame ensures that the client device will concurrently present the audio data and the corresponding UI frame.

Figure 3:
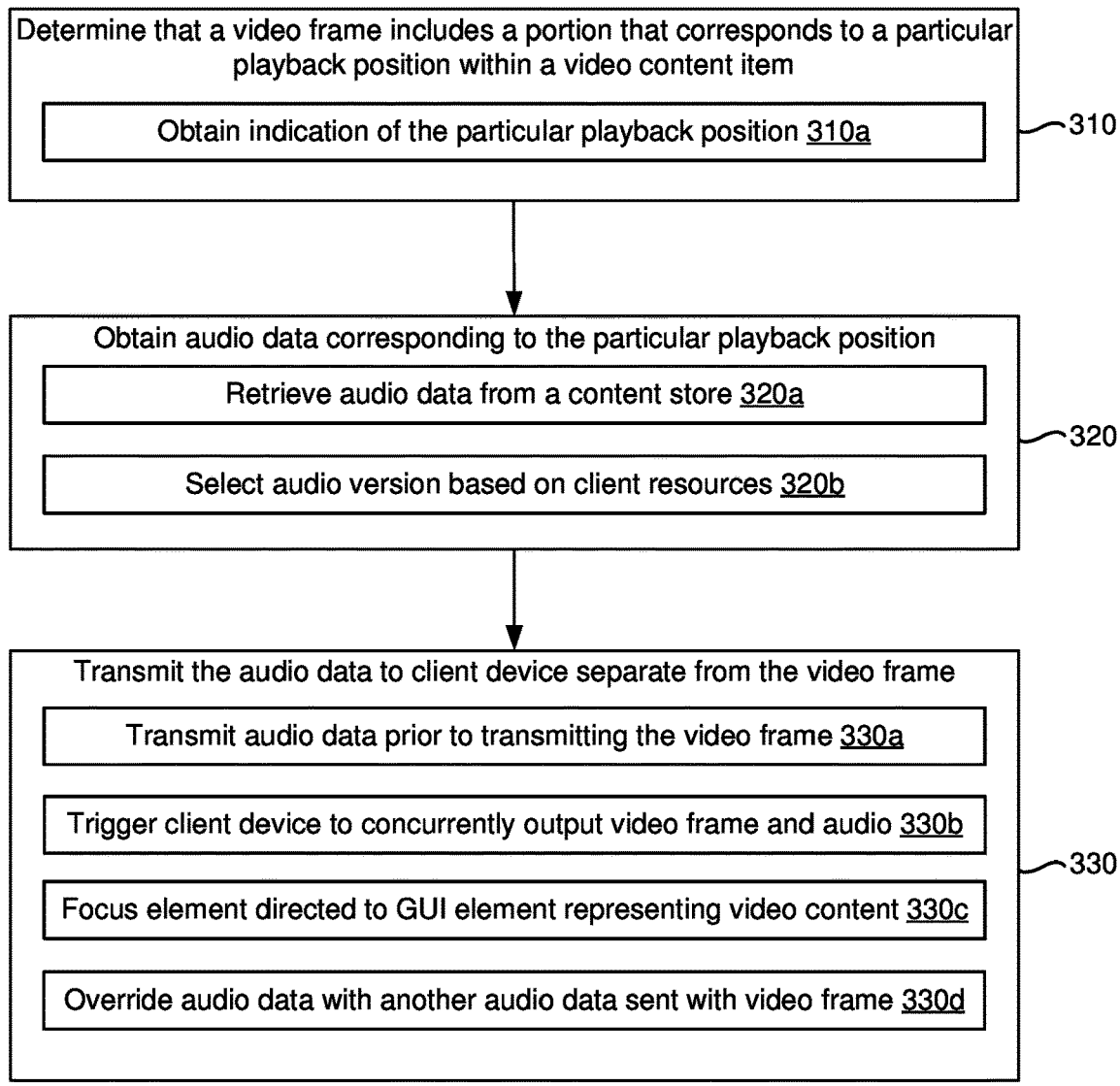
FIG. 3 is a flowchart representation of a method of providing audio data for a video frame in accordance with some implementations.

FIG. 3 is a flowchart representation of a method 300 for providing audio data for a UI frame that includes a representation of a GUI element and a representation of a content frame that corresponds to a media content item. In various implementations, the method 300 is performed by a device (e.g., by the edge device 40, for example, by the audio data provider 42 shown in FIGS. 1A-1G, by the cloud computing platform 60, for example, by the client UI generator 80 shown in FIGS. 1A-1G, and/or by the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes determining that a video frame to be presented at a client device includes a portion that corresponds to a particular playback position within a video content item. For example, as represented by block 310*a*, in some implementations, the method 300 includes obtaining an indication of the particular playback position. For example, as shown in FIG. 1A, the edge device 40 (e.g., the audio data provider 42) receives the indication 82 from the cloud computing platform 60 that the cloud computing platform 60 is going to generate a UI frame that includes at least one of the user interface elements 100 and a representation (e.g., a reduced-size version) of one of the content frames 122*a*, 122*b*, . . . , and 122*n*.

In some implementations, the method 300 includes obtaining a value indicative of a presentation timestamp (PTS) that corresponds to the particular playback position. For example, as shown in FIGS. 1A and 2, in some implementations, the indication 82 includes the playback position indicator 82*b* that refers to one of the presentation timestamps 126*a*, 126*b*, . . . , and 126*n*.

In some implementations, the method 300 includes obtaining a value indicative of a frame identifier (ID) that corresponds to the particular playback position. For example, as shown in FIGS. 1A and 2, in some implementations, the indication 82 includes the content frame ID 82*a* that references a frame ID of one of the content frames 122*a*, 122*b*, . . . , and 122*n*.

In some implementations, the method 300 includes obtaining the video frame and determining the particular playback position based on metadata associated with the video frame. In some implementations, the metadata includes the presentation timestamp that corresponds to the particular playback position. In some implementations, the metadata includes the frame ID that corresponds to the particular playback position.

As represented by block 320, in some implementations, the method 300 includes obtaining audio data that corresponds to the particular playback position within the video content item. For example, as shown in FIGS. 1A and 2, the edge device 40 (e.g., the audio data provider 42) retrieves the first audio data 124*a* from the content store 110, for example, because the content frame ID 82*a* includes a frame ID of the first content frame 122*a* and/or because the playback position indicator 82*b* references the first presentation timestamp 126*a*.

As represented by block 320*a*, in some implementations, obtaining the audio data includes retrieving the audio data from a content store that stores the video content item. For example, as shown in FIG. 2, the audio data obtainer 220 retrieves the first audio data 124*a* from the content store 110 that stores the media content item 120.

In some implementations, obtaining the audio data includes identifying the audio data that corresponds to the particular playback position based on a presentation timestamp (PTS) associated with the particular playback position. For example, as described in relation to FIG. 2, in some implementations, the playback position indicator 82*b* includes a value that refers to one of the presentation timestamps 126*a*, 126*b*, . . . , and 126*n*, and the audio data obtainer 220 obtains a particular one of the audio data 124*a*, 124*b*, . . . , and 124*n* that corresponds to the presentation timestamp referenced by the playback position indicator 82*b*. For example, as illustrated in FIG. 2, the audio data obtainer 220 retrieves the first audio data 124*a*, for example, because the playback position indicator 82*b* includes the first presentation timestamp 126*a*.

As represented by block 320*b*, in some implementations, obtaining the audio data includes obtaining client resources availability data that indicates an availability of resources to the client device, and selecting a first version of the audio data from a plurality of versions of the audio data based on the availability of resources indicated by the client resources availability data. For example, as shown in FIG. 1F, in some implementations, the edge device 40 (e.g., the audio data provider 42) obtains the client resources availability data 22, and the edge device 40 selects the first version 124*a*1 of the first audio data 124*a* based on the client resources availability data 22.

In some implementations, the client resources availability data indicates an amount of bandwidth that is available to the client device. For example, as shown in FIG. 2, in some implementations, the client resources availability data 22 indicates a client bandwidth 22*a*. In some implementations, the plurality of versions are associated with respective sampling rates. For example, as described in relation to FIG. 2, in some implementations, the first version 124*a*1 is associated with a first sampling rate and the second version 124*a*2 is associated with a second sampling rate that is greater than the first sampling rate. In some implementations, obtaining the audio data includes selecting the first version in response the amount of bandwidth being less than a bandwidth threshold, and selecting a second version of the plurality of versions in response to the amount of bandwidth being greater than the bandwidth threshold. For example, as described in relation to FIG. 2, in some implementations, the audio data obtainer 220 selects the first version 124*a*1 when the client bandwidth 22*a* is less than a bandwidth threshold, and the audio data obtainer 220 selects the second version 124*a*2 when the client bandwidth 22*a* is greater than or equal to the bandwidth threshold.

In some implementations, the client resources availability data indicates a number of speakers coupled with the client device. For example, as shown in FIG. 2, in some implementations, the client resources availability data 22 indicates a number of speakers 22b that are coupled with the client device. In some implementations, the first version is a stereophonic version of the audio data and a second version of the plurality of versions is a surround sound version of the audio data. For example, as described in relation to FIG. 2, in some implementations, the third version 124a3 is a stereophonic version that is more suitable when the client device is coupled with two or less speakers, and the fourth version 124a4 is a surround sound version that is more suitable when the client device is coupled with more than two speakers (e.g., five or more speakers). In some implementations, obtaining the audio data includes selecting the first version in response to the number of speakers being less than a threshold number, and selecting the second version in response to the number of speakers being greater than the threshold number. For example, as described in relation to FIG. 2, in some implementations, the audio data obtainer 220 selects the third version 124a3 when the number of speakers 22b is less than a threshold number of speakers (e.g., when the number of speakers 22b is less than three), and the audio data obtainer 220 selects the fourth version 124a4 when the number of speakers 22b is greater than or equal to the threshold number of speakers (e.g., when the number of speakers 22b is greater than or equal to three, for example, when the number of speakers 22b is greater than or equal to five).

As represented by block 330, in some implementations, the method 300 includes transmitting the audio data to the client device separate from the video frame. For example, as shown in FIGS. 1A and 1B, the edge device 40 (e.g., the audio data provider 42) transmits the first audio data 124a to the client device 20 separate from the first UI frame 84a. As represented by block 330a, in some implementations, transmitting the audio data separate from the video frame includes transmitting the audio data to the client device prior to transmitting the video frame to the client device. For example, as shown in FIGS. 1A and 1B, the edge device 40 transmits the first audio data 124a to the client device 20 prior to transmitting the first UI frame 84a to the client device 20.

As represented by block 330b, in some implementations, the method 300 includes triggering the client device to concurrently display the video frame on a display coupled with the client device and play an audible signal that corresponds to the audio data on a speaker coupled with the client device. For example, as shown in FIG. 1B, the edge device 40 (e.g., the audio data provider 42) instructs the client device 20 to concurrently display the first UI frame 84a and output the audible signal 24a that is generated based on the first audio data 124a.

In some implementations, transmitting the audio data includes associating the audio data with a presentation timestamp (PTS) that corresponds to the particular playback position in order to allow the client device to concurrently display the video frame and output an audible signal that is generated based on the audio data. For example, as described in relation to FIG. 1A, in some implementations, the audio data provider 42 associates the first presentation timestamp 126a with the first audio data 124a prior to transmitting the first audio data 124a to the client device 20 in order to allow the client device 20 to concurrently display the first UI frame 84a and output the audible signal 24a that is generated based on the first audio data 124a.

As represented by block 330c, in some implementations, transmitting the audio data includes transmitting the audio data in response to obtaining an indication that a focus element is directed to a graphical user interface element representing the video content item. For example, with reference to FIG. 1A, in some implementations, the edge device 40 (e.g., the audio data provider 42) transmits the first audio data 124a to the client device 20 in response to receiving an indication that a pointer has hovered over the UI element 100b for a threshold amount of time (e.g., for two seconds). As another example, in some implementations, the edge device 40 transmits the first audio data 124a to the client device 20 in response to determining that the UI element 100b has been within a selection window for the threshold amount of time.

In some implementations, the client UI generator 80 automatically starts playback of the media content item 120 in response to the focus element being directed to the graphical user interface element representing the video content item for a first threshold amount of time, and the edge device 40 transmits the audio data in response to the focus element being directed to the graphical user interface element representing the video content item for a second threshold amount of time that is less than the first threshold amount of time. For example, the client UI generator 80 automatically starts playback of the media content item 120 in response to the UI element 100b being within a selection window for three seconds, and the edge device 40 transmits the first audio data 124a in response to the UI element 100b being within the selection window for two seconds.

As represented by block 330d, in some implementations, the method 300 includes, after transmitting the audio data, transmitting the video frame and second audio data associated with the video frame, instructing the client device to forgo outputting an audible signal that corresponds to the audio data when the video frame is displayed (e.g., instructing the client device to replace the audio data with the second audio data), and triggering the client device to concurrently display the video frame and output an audible signal that corresponds to the second audio data. For example, as shown in FIG. 1G, the UI audio data 86a overrides (e.g., replaces) the first audio data 124a.

Figure 4:
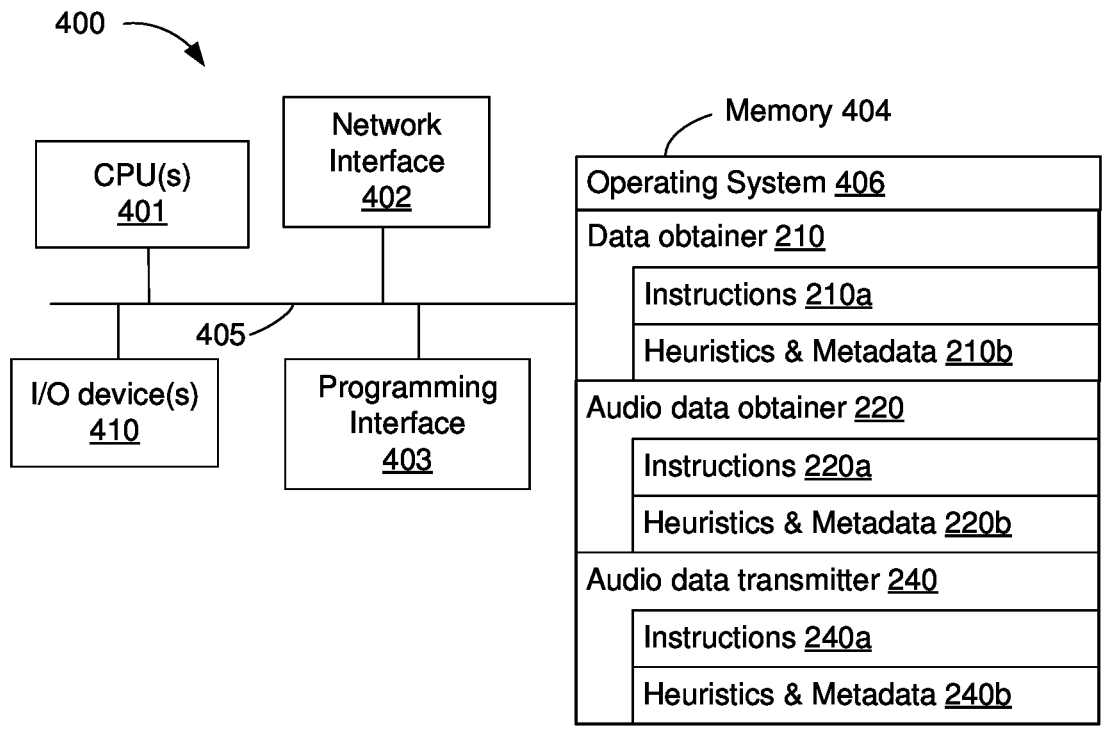
FIG. 4 is a block diagram of a device that provides audio data for a video frame in accordance with some implementations.

FIG. 4 is a block diagram of a device 400 in accordance with some implementations. In some implementations, the device 400 implements the cloud computing platform 60 (e.g., the client UI generator 80) and/or the edge device 40 (e.g., the audio data provider 42) shown in FIGS. 1A-1G, and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the audio data obtainer 220 and the audio data transmitter 240. In various implementations, the device 400 performs the method 300 shown in FIG. 3.

In some implementations, the data obtainer 210 includes instructions 210a, and heuristics and metadata 210b for obtaining an indication that a UI frame to be transmitted to a client device includes a representation of a content frame that corresponds to a media content item. In some implementations, the data obtainer 210 performs at least some of the operation(s) represented by block 310 in FIG. 3.

In some implementations, the audio data obtainer 220 includes instructions 220a, and heuristics and metadata 220b for obtaining an audio data that corresponds to the content frame that the UI frame includes. In some implementations, the audio data obtainer 220 performs at least some of the operation(s) represented by block 320 in FIG. 3.

In some implementations, the audio data transmitter 240 includes instructions 240a, and heuristics and metadata 240b for transmitting the audio data to the client device separate from the UI frame. In some implementations, the audio data transmitter 240 performs at least some of the operation(s) represented by block 330 in FIG. 3.

In some implementations, the one or more I/O devices 410 include a receiver for receiving the indication and a transmitter for transmitting the audio data to the client device.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at an edge device including a non-transitory memory and one or more processors:
determining that a user interface frame to be presented at a client device includes a reduced-size version of a video frame that corresponds to a particular playback position within a video content item and an image of a user interface element;
obtaining, from a content store that stores the video content item, audio data that corresponds to the particular playback position within the video content item;
transmitting the audio data to the client device prior to transmitting the user interface frame;
after transmitting the audio data to the client device, obtaining the user interface frame from a cloud computing platform that generated the user interface frame by combining the reduced-size version of the video frame and the image of the user interface element; and
transmitting the user interface frame to the client device for concurrent presentation with the audio data that was transmitted to the client device prior to transmitting the user interface frame, wherein transmitting the audio data prior to transmitting the user interface frame allows the client device to output an audible signal that corresponds to the audio data while continuing to display a previous user interface frame when timely transmission of the user interface frame to the client device is unsuccessful.

2. The method of claim 1, further comprising triggering the client device to concurrently display the user interface frame on a display coupled with the client device and play the audible signal that corresponds to the audio data on a speaker coupled with the client device.

3. The method of claim 1, wherein transmitting the audio data comprises associating the audio data with a presentation timestamp (PTS) that corresponds to the particular playback position in order to allow the client device to concurrently display the user interface frame and output the audible signal that is generated based on the audio data.

4. The method of claim 1, wherein transmitting the audio data comprises transmitting the audio data in response to obtaining an indication that a focus element is directed to a graphical user interface element representing the video content item.

5. The method of claim 1, further comprising:
after transmitting the audio data:
transmitting the user interface frame and second audio data associated with the user interface frame, wherein the edge device obtains the second audio data from the cloud computing platform;
instructing the client device to forgo outputting the audible signal that corresponds to the audio data when the user interface frame is displayed; and
triggering the client device to concurrently display the user interface frame and output an audible signal that corresponds to the second audio data.

6. The method of claim 1, wherein obtaining the audio data comprises identifying the audio data that corresponds to the particular playback position based on a presentation timestamp (PTS) associated with the particular playback position.

7. The method of claim 1, wherein obtaining the audio data comprises:
   obtaining client resources availability data that indicates an availability of resources to the client device; and
   selecting a first version of the audio data from a plurality of versions of the audio data based on the availability of resources indicated by the client resources availability data.

8. The method of claim 7, wherein the client resources availability data indicates an amount of bandwidth that is available to the client device;
   wherein the first version is associated with a first sampling rate and a second version of the audio data is associated with a second sampling rate; and
   wherein obtaining the audio data comprises:
      selecting the first version in response to the amount of bandwidth being less than a bandwidth threshold; and
      selecting the second version in response to the amount of bandwidth being greater than the bandwidth threshold.

9. The method of claim 7, wherein the client resources availability data indicates a number of speakers coupled with the client device;
   wherein the first version is a stereophonic version of the audio data and a second version of the plurality of versions is a surround sound version of the audio data; and
   wherein obtaining the audio data comprises:
      selecting the first version in response to the number of speakers being less than a threshold number; and
      selecting the second version in response to the number of speakers being greater than the threshold number.

10. The method of claim 1, wherein determining that the user interface frame includes the reduced-size version of the video frame that corresponds to the particular playback position comprises obtaining an indication of the particular playback position.

11. The method of claim 1, wherein determining that the user interface frame includes the reduced-size version of the video frame that corresponds to the particular playback position comprises obtaining a value indicative of a presentation timestamp (PTS) that corresponds to the particular playback position.

12. The method of claim 1, wherein determining that the user interface frame includes the reduced-size version of the video frame that corresponds to the particular playback position comprises obtaining a value indicative of a frame identifier (ID) that corresponds to the particular playback position.

13. The method of claim 1, wherein determining that the user interface frame includes the reduced-size version of the video frame that corresponds to the particular playback position comprises obtaining the user interface frame and determining the particular playback position based on metadata associated with the user interface frame.

14. An edge device comprising:
   one or more processors;
   a non-transitory memory; and
   one or more programs stored in the non-transitory memory, which, when executed by the one or more processors, cause the device to:
      determine that a user interface frame to be presented at a client device includes a reduced-size version of a video frame that corresponds to a particular playback position within a video content item and an image of a user interface element;
      obtain, from a content store that stores the video content item, audio data that corresponds to the particular playback position within the video content item;
      transmit the audio data to the client device prior to transmitting the user interface frame;
      after transmitting the audio data to the client device, obtain the user interface frame from a cloud computing platform that generated the user interface frame by combining the reduced-size version of the video frame and the image of the user interface element; and
      transmit the user interface frame to the client device for concurrent presentation with the audio data that was transmitted to the client device prior to transmitting the user interface frame, wherein transmitting the audio data prior to transmitting the user interface frame allows the client device to output an audible signal that corresponds to the audio data while continuing to display a previous user interface frame when timely transmission of the user interface frame to the client device is unsuccessful.

15. The edge device of claim 14, wherein the one or more programs further cause the edge device to trigger the client device to concurrently display the user interface frame on a display coupled with the client device and play the audible signal that corresponds to the audio data on a speaker coupled with the client device.

16. The edge device of claim 14, wherein transmitting the audio data comprises associating the audio data with a presentation timestamp (PTS) that corresponds to the particular playback position in order to allow the client device to concurrently display the user interface frame and output the audible signal that is generated based on the audio data.

17. A non-transitory memory storing one or more programs, which, when executed by one or more processors of an edge device, cause the edge device to:
   determine that a user interface frame to be presented at a client device includes a reduced-size version of a video frame that corresponds to a particular playback position within a video content item and an image of a user interface element;
   obtain, from a content store that stores the video content item, audio data that corresponds to the particular playback position within the video content item;
   transmit the audio data to the client device prior to transmitting the user interface frame;
   after transmitting the audio data to the client device, obtain the user interface frame from a cloud computing platform that generated the user interface frame by combining the reduced-size version of the video frame and the image of the user interface element; and
   transmit the user interface frame to the client device for concurrent presentation with the audio data that was transmitted to the client device prior to transmitting the user interface frame, wherein transmitting the audio data prior to transmitting the user interface frame allows the client device to output an audible signal that corresponds to the audio data while continuing to display a previous user interface frame when timely transmission of the user interface frame to the client device is unsuccessful.

\* \* \* \* \*